(12) United States Patent
Yoo

(10) Patent No.: US 7,348,549 B2
(45) Date of Patent: Mar. 25, 2008

(54) LIGHT SCANNING APPARATUS

(75) Inventor: Jae-Hwan Yoo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/716,053

(22) Filed: Mar. 9, 2007

(65) Prior Publication Data

US 2007/0170356 A1    Jul. 26, 2007

Related U.S. Application Data

(63) Continuation of application No. 11/143,626, filed on Jun. 3, 2005, now Pat. No. 7,247,841.

(30) Foreign Application Priority Data

Oct. 7, 2004    (KR) .......................... 2004-0079962

(51) Int. Cl.
*H01J 3/14* (2006.01)
*G02B 26/08* (2006.01)

(52) U.S. Cl. ...................... 250/234; 250/236; 347/256; 347/261; 359/212; 359/216

(58) Field of Classification Search ........ 250/234–236; 347/241, 243, 256, 259–261; 359/201, 212, 359/216, 220–221, 223
See application file for complete search history.

(56) References Cited

U.S. PATENT DOCUMENTS 6,865,004 B2 * 3/2005 Kim ............................ 359/205

2004/0109211 A1    6/2004  Kato

FOREIGN PATENT DOCUMENTS

| JP | 08-160337 | 6/1996 |
|---|---|---|
| JP | 08-190070 | 7/1996 |
| JP | 08-216450 | 8/1996 |
| JP | 09-054263 | 2/1997 |
| JP | 11-088619 | 3/1999 |
| JP | 11-231249 | 8/1999 |
| JP | 2000-180763 | 6/2000 |
| JP | 2001-051223 | 2/2001 |
| JP | 2003-307689 | 10/2003 |
| KR | 10-2001-0019675 A | 3/2001 |

* cited by examiner

*Primary Examiner*—Kevin Pyo
(74) *Attorney, Agent, or Firm*—Roylance, Abrams, Berdo & Goodman, LLP.

(57) ABSTRACT

Provided is a light scanning apparatus, including a light source, a light source controller to control an on/off operation of the light source, a light deflector deflecting light emitted from the light source, an image formation optical system to direct light deflected by the light deflector on a scan area of a to-be-scanned surface, a synchronous signal detector to receive the light emitted from the light source and to detect a synchronous signal for light scanning, and a light path changer changing a path of light emitted from the light source and incident upon the light deflector.

3 Claims, 4 Drawing Sheets

LIGHT SCANNING APPARATUS

PRIORITY

This application is a continuation of U.S. patent application Ser. No. 11/143,626, filed on Jun. 3, 2005, now U.S. Pat. No. 7,247,841, and claims the benefit under 35 U.S.C. § 119(a) of Korean Patent Application No. 2004-79962, filed on Oct. 7, 2004, the entire disclosures of both of which are hereby incorporated by reference.

BACKGROUND OF THE INVENTION

1. Field of the Invention:

The present invention relates to a light scanning apparatus for scanning light emitted from a light source. More particularly, the present invention relates to a light scanning apparatus having a relatively compact structure.

2. Description of the Related Art:

Generally, light scanning apparatuses such as laser scanning units, are applied to image forming apparatuses for printing an image on paper. Examples of image forming apparatuses include copiers, laser printers, and the like. In light scanning apparatuses, light emitted from a light source scans a photosensitive medium to form an electrostatic latent image.

FIG. 1 is a construction diagram of an example of a conventional light scanning apparatus. FIG. 2 illustrates an angle at which a beam of light is incident upon a rotational multi-sided mirror 7.

Referring to FIG. 1, the conventional light scanning apparatus includes a light source 2 formed of a laser diode. A light source controller controls an on/off operation of the light source 2 and a collimating lens 3 to convert divergent laser light emitted from the light source 2 into parallel light or convergent light. The light source controller also controls a cylinder lens 5 for making laser light which passes through the collimating lens 3 to have a bar-shaped cross-section. Additionally, the light source controller controls the rotational multi-sided mirror 7 for deflecting laser light, an f-θ lens 9 disposed between the rotational multi-sided mirror 7 and a to-be-scanned surface 20, a reflection mirror 11 reflecting laser light for use in synchronous signal detection, a synchronous signal detection lens 13 collecting the laser light reflected by the reflection mirror 11, and a photodetector 15 to receive laser light for use in synchronous signal detection. The light source controller is comprised of a semiconductor device installed on a circuit board 1 and a control circuit formed in a predetermined pattern. The light source 2 and the photodetector 15 are generally installed on the circuit board 1 in order to minimize the size of the light scanning apparatus and to reduce manufacturing costs.

Referring to FIG. 2, laser light beam $A_1$ is incident upon the rotational multi-sided mirror 7 at an angle $\theta_1$ with a normal line $N_1$ of a mirror side 7a. The rotational multi-sided mirror 7 is hexagonal. A length $L_1$ of each side of the rotational multi-sided mirror 7 is proportional to the incidence angle $\theta_1$. Thus, as the incidence angle $\theta_1$ increases, the length $L_1$ of each side of the rotational multi-sided mirror 7 increases. Consequently, the rotational multi-sided mirror 7 is enlarged. Enlarging the rotational multi-sided mirror 7 leads to increased costs for manufacturing the light scanning apparatus. Also, noise generated due to rotation of the rotational multi-sided mirror 7 is increased.

As shown in FIG. 1, in order to solve the above-described problems, the light source 2 and the circuit board 1 may be disposed so that a light beam is incident upon the rotational multi-sided mirror 7 at an angle to the to-be-scanned surface 20 instead of being parallel thereto. However, in this case, the photodetector 15 is rendered aslant. Consequently, the laser light used in synchronous signal detection is incident aslant upon a light receiving surface of the photodetector 15. Consequently, the reliability of synchronous signal detection degrades.

Accordingly, there is a need for a light scanning apparatus in which light is incident upon a side of a rotational multi-sided mirror at an angle smaller than that in a conventional light scanning apparatus.

SUMMARY OF THE INVENTION

An aspect of the present invention is to solve at least the above problems and/or disadvantages and to provide at least the advantages described below. Accordingly, an aspect of the present invention is to provide a light scanning apparatus in which light is incident upon a side of a rotational multi-sided mirror at an angle smaller than that in a conventional light scanning apparatus so that the rotational multi-sided mirror is minimized in size.

Another aspect of the invention is to provide a light scanning apparatus in which a synchronous signal is more reliably detected.

According to an yet another aspect of the present invention, there is provided a light scanning apparatus which comprises a light source, a light source controller for controlling on/off operation of the light source, a light deflector to deflect light emitted from the light source, and an image formation optical system to direct light deflected by the light deflector on a scan area of a to-be-scanned surface. Additionally, a synchronous signal detector to receive the light emitted from the light source and detecting a synchronous signal for light scanning is disclosed. A light path changer to change a path of light emitted from the light source is provided to incident light upon the light deflector.

It is also preferable that the light path changer include a first reflection mirror to reflect light emitted from the light source. Moreover, the light path changer may also include a second reflection mirror which re-reflects the light reflected by the first reflection mirror so that the re-reflected light advances toward the light deflector.

It is also preferable that a rectilinear line extending in a direction of the light emitted from the light source may not be parallel to a rectilinear line extending in a direction of the light incident upon the light deflector.

It is still preferable that the light source controller include a circuit board and a control circuit formed on the circuit board to have a predetermined pattern. The synchronous signal detector may include a photodetector that receives light and converts the light into a synchronous signal. The photodetector may be mounted on the circuit board of the light source controller.

An incidence angle made by a rectilinear line preferably extends in a direction of light incident upon a light-receiving surface of the photodetector and a normal line perpendicular to a light-receiving surface of the photodetector may be about 0 degrees.

The rectilinear line extending in the direction of the light emitted from the light source may be substantially parallel to the rectilinear line extending in the direction of light incident upon a light-receiving surface of the photodetector.

The light scanning apparatus may further include a collimating lens which converts the light emitted from the light source into parallel light or convergent light, and a cylinder lens which transforms the light passed through collimating lens so that a cross-section of the light is in a bar shape. The light path changer may be disposed between the cylinder lens and the light deflector so as to change a path of light passed through the cylinder lens.

Other objects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
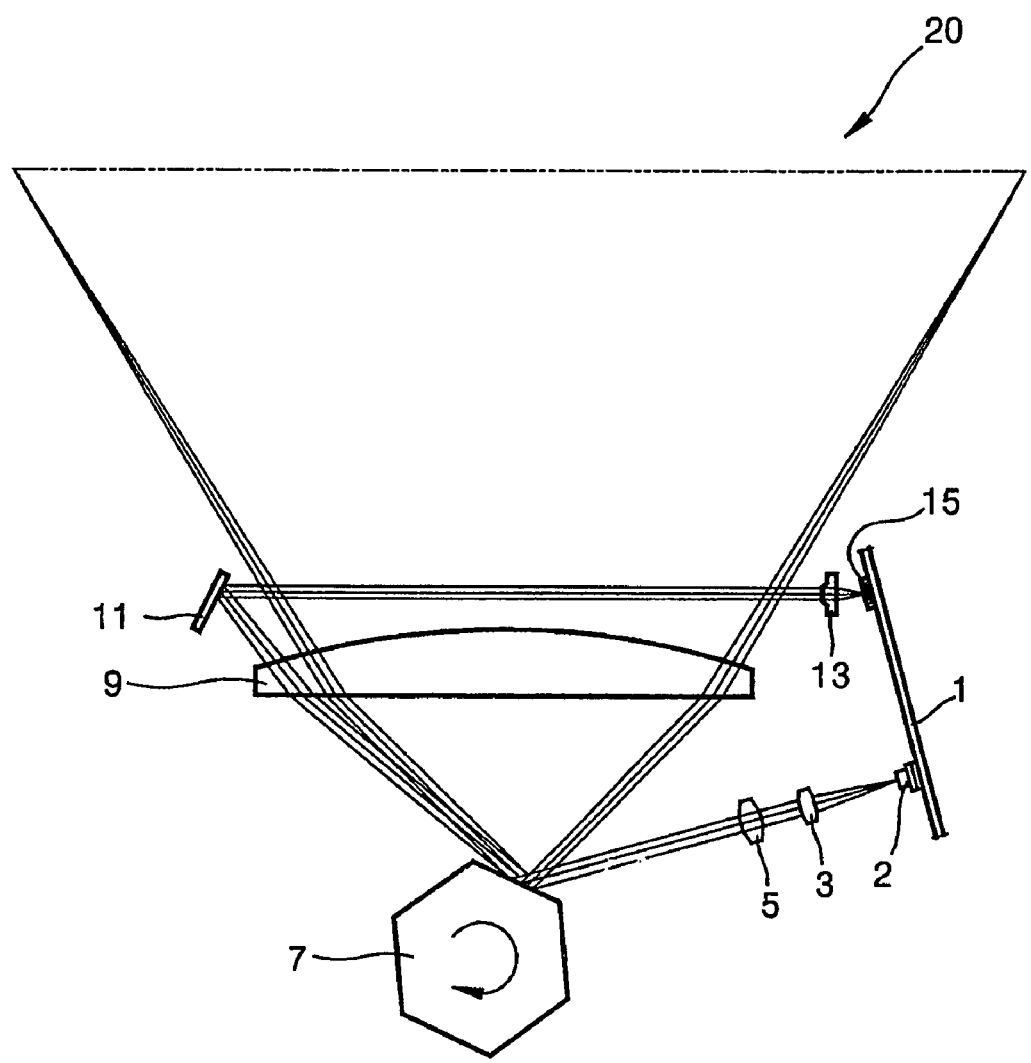
FIG. 1 is a construction diagram of an example of a conventional light scanning apparatus.
Figure 2:
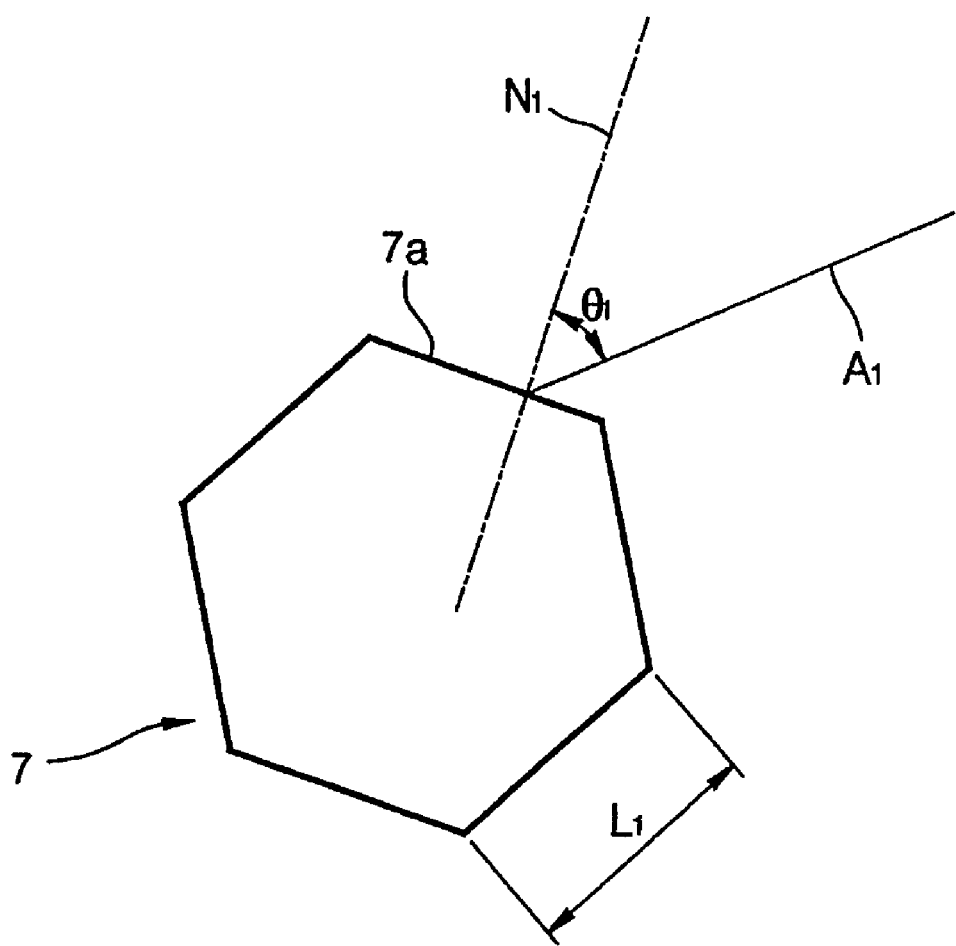
FIG. 2 illustrates an angle at which light is incident upon a rotational multi-sided mirror of FIG. 1.
Figure 3:
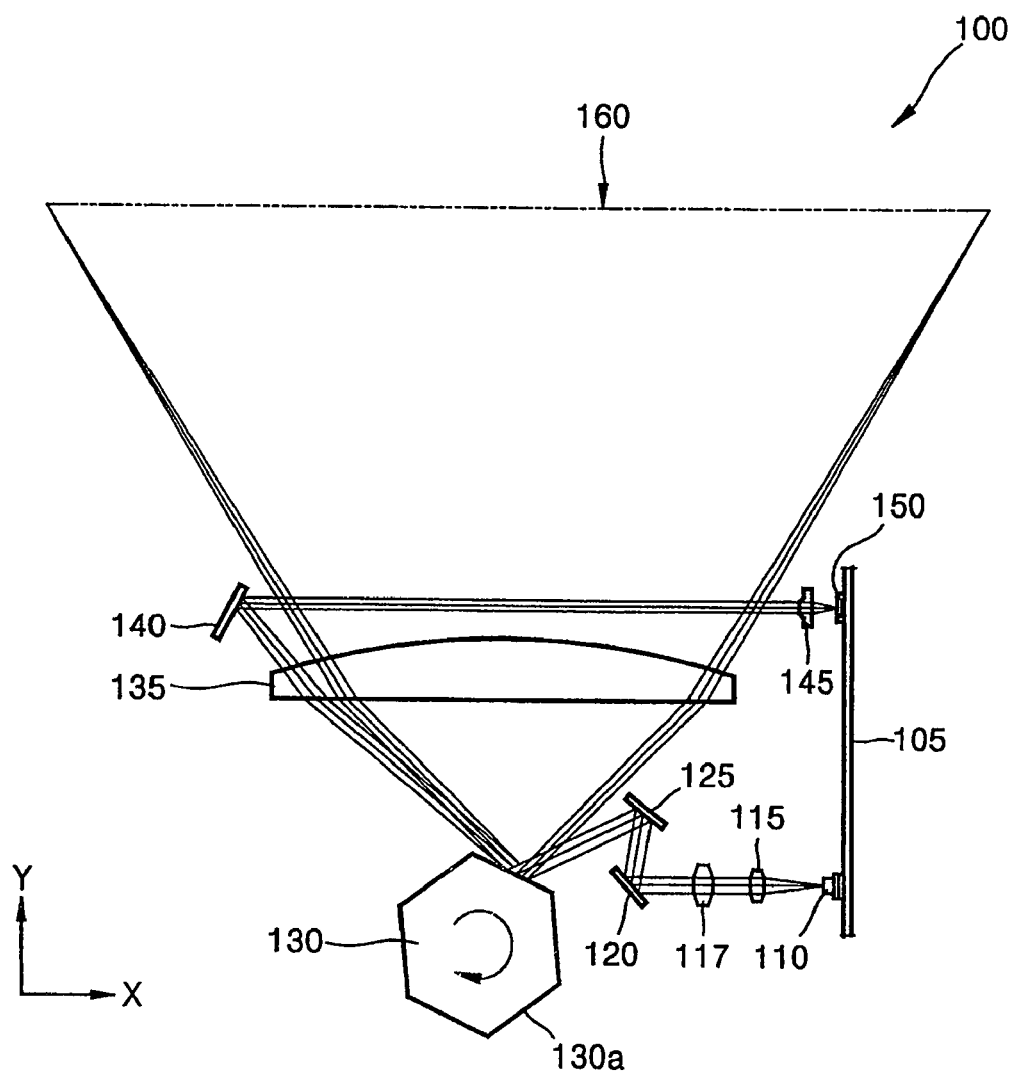
FIG. 3 is a construction diagram of a light scanning apparatus in accordance with an exemplary embodiment of the present invention.
Figure 4:
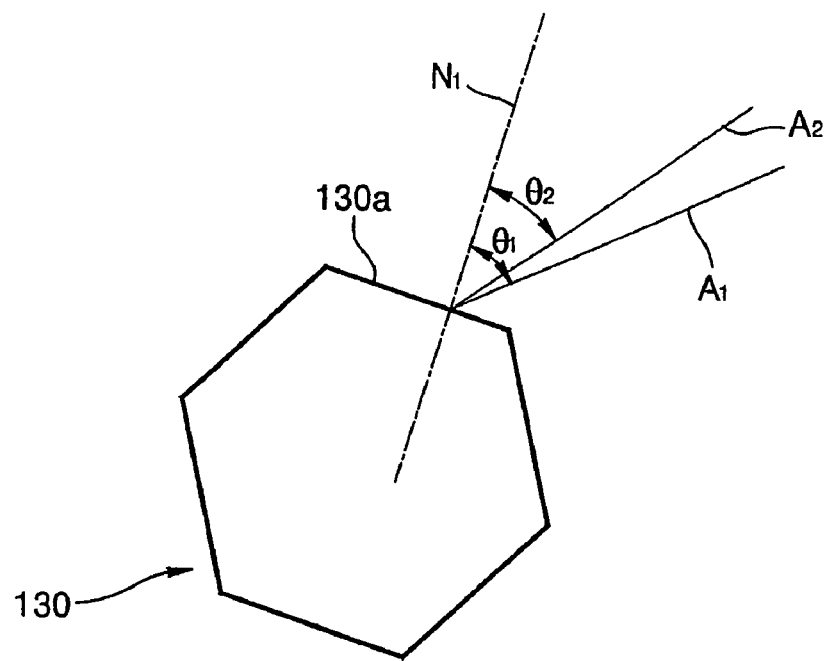
FIG. 4 illustrates the light incidence angle of FIG. 2 and an angle at which light is incident upon a rotational multi-sided mirror of FIG. 3.
Figure 5:
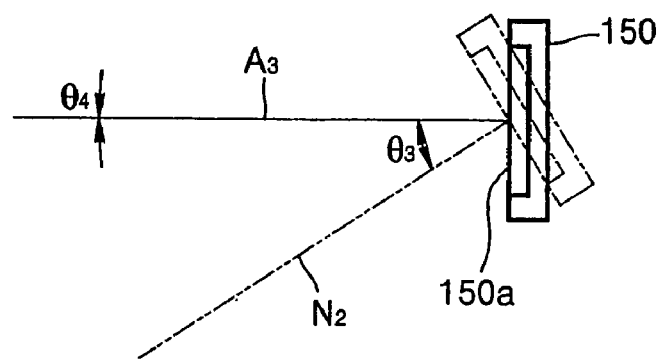
FIG. 5 illustrates angles at which light is incident upon photodetectors of a conventional light scanning apparatus and the light scanning apparatus of FIG. 3.

FIG. 3 is a construction diagram of a light scanning apparatus 100 according to an exemplary embodiment of the present invention. FIG. 4 illustrates a light incidence angle of FIG. 2 and an angle at which light is incident upon a rotational multi-sided mirror 130 of FIG. 3. FIG. 5 illustrates angles at which light is incident upon a photodetector of a conventional light scanning apparatus and a photodetector 150 of FIG. 3.

Referring to FIG. 3, the light scanning apparatus 100 includes a light source 110, a light deflector, an image formation optical system, a synchronous signal detector, a light source controller, a collimating lens 115, and a cylinder lens 117. The light source 110 emits light according to an image signal. The light deflector includes the rotational multi-sided mirror 130 to deflect light emitted from the light source 10. The image formation optical system forms an image on a to-be-scanned surface 160. For example, an image is formed on an image-forming surface of a photosensitive medium of an image forming apparatus by scanning the to-be-scanned surface 160 with light deflected by the light deflector. The synchronous signal detector detects a synchronous signal for horizontal synchronization using part of the light deflected by the light deflector. The light source controller controls an on/off operation of the light source 110 according to the image signal. The collimating lens 115 converts divergent light emitted from the light source 110 into parallel light or convergent light. The cylinder lens 117 transmits the light which passes through the collimating lens 115. Thus, the light is directed linearly on a surface of the rotational multi-sided mirror 130. The cylinder lens 117 has different refraction rates in a main scan direction parallel to an axis X and a sub-scan direction parallel to an axis Z, which is perpendicular to axes X and Y. Thus, the cylinder lens 117 can direct light on a surface of the rotational multi-sided mirror 130 linearly in the main scan direction.

The light source 110 may be formed of a single light source or a plurality of light sources. Each light source has either a single light-emitting point or a plurality of light-emitting points. Preferably, a laser diode is used as the light source 110 to emit laser light.

The light source controller includes a circuit board 105 and a control circuit formed on the circuit board 105 to have a predetermined pattern. The light source 110 is mounted on the circuit board 105. Light emitted from the light source 110 advances in a direction substantially parallel to the axis X via the collimating lens 115. The term "substantially" means that a slight error may be allowed due to a factor, such as a technical limit or the like.

To set a traveling direction of the light emitted from the light source 110 to be parallel to the axis X, the circuit board 105 is located on a plane substantially parallel to a plane including the axes Y and Z (i.e., a Y-Z plane).

The light deflector projects light at an equi-linear speed in a horizontal direction. That is, the main scan direction, and includes the rotational multi-sided mirror 130. The multi-sided mirror is preferably hexagonal. The light deflector also includes a driving source (not shown), such as a motor for rotating the rotational multi-sided mirror 130. Referring to FIG. 3, the rotational multi-sided mirror 130 is rotated at a constant speed in one direction by the driving source during image formation and has a plurality of sides 130a.

The image formation optical system forms an image on the to-be-scanned surface 160. For example, the image formation optical system forms an image-forming surface of a photosensitive medium by correcting an aberration of light deflected by the side 130a of the rotational multi-sided mirror 130. The image formation optical system is formed of one or more optical components including an f-θ lens 135. The f-θ lens 135 advances light deflected by the side 130a of the rotational multi-sided mirror 130 in the main scan direction and the sub-scan direction with different refraction rates so that an image is formed on the to-be-scanned surface 160.

The synchronous signal detector includes a third reflection mirror 140 for changing a travel path of light for synchronous signal detection deflected by the rotational multi-sided mirror 130. The synchronous signal detector also includes a synchronous signal detection lens 145 for focusing light reflected by the third reflection mirror 140 and a photodetector 150 to receive the light for synchronous signal detection focused by the synchronous signal detection lens 145. The light for synchronous signal detection reflected by the third reflection mirror 140 travels substantially parallel to the axis X, like the light emitted from the light source 110. Then, the light sequentially passes through the collimating lens 115 and the cylinder lens 117. The synchronous signal detection lens 145 directs the light for synchronous signal detection on a light-receiving surface 150a (see FIG. 5) of the photodetector 150. The photodetector 150 receives the light for synchronous signal detection and converts the same into a synchronous signal for horizontal synchronization. The photodetector 150 is mounted on the circuit board 105, which is included in the light source controller.

The light scanning apparatus 100 includes a light path changer for changing a path of light emitted from the light source 110 and incident upon the rotational multi-sided mirror 130 of the light deflector. More specifically, the light path changer is located between the cylinder lens 117 and the rotational multi-sided mirror 130 so as to change a path of light transmitted through the cylinder lens 117. The light path changer includes first and second reflection mirrors 120 and 125. The first reflection mirror 120 reflects light emitted from the light source 110 that passes through the cylinder lens 117. The second reflection mirror 125 re-reflects light reflected by the first reflection mirror 120 so that the re-reflected light is incident upon the rotational multi-sided mirror 130. The light emitted from the light source 110 sequentially passes through the collimating lens 115. The cylinder lens 117 is not parallel to the light incident upon the rotational multi-sided mirror 130 which is reflected by the second reflection mirror 125.

Referring to FIG. 4, an angle $\theta_2$ at which light is incident upon the side 130a of the rotational multi-sided mirror 130 may be smaller than an angle $\theta_1$ in a conventional light scanning apparatus. This is due to the change of the light path by the first and second reflection mirrors 120 and 125. More specifically, the angle $\theta_2$ in the light scanning apparatus 100 is smaller than the angle $\theta_1$ in the conventional light scanning apparatus when a rotating multi-sided mirror in the conventional light scanning apparatus and the rotational multi-sided mirror 130 are rotated and located at an identical position. Reference characters $A_1$ and $A_2$ denote a direction of incident light in the conventional light scanning apparatus and a direction of incident light in the light scanning apparatus 100, respectively. Reference character $N_1$ denotes a normal line perpendicular to the side 130a.

Referring to FIG. 5, the photodetector 150 mounted on the circuit board 105 of FIG. 3 is disposed so that an angle $\theta_4$ made by a rectilinear line $A_3$ extends in a direction of light incident upon the light-receiving surface 150a and a normal line perpendicular to the light-receiving surface 150a is about 0 degrees. On the other hand, in a conventional apparatus, although a traveling direction of light incident upon a photodetector is the same as the direction of the light incident upon the light-receiving surface 150a of the photodetector 150 in the present embodiment, a normal line $N_2$ perpendicular to the light-receiving surface 150a of the photodetector 150 is at an angle in contrast with the present invention. Hence, an incidence angle $\theta_3$ made by the rectilinear line $A_3$ extending in the direction of the light incident upon the light-receiving surface 150a and the normal line $N_2$ is about no less than 0 and no more than 90.

A light scanning apparatus in accordance with embodiments of the present invention has the following effects. First, an angle at which light is incident upon a light deflector may be reduced compared with conventional apparatuses. Accordingly, the light deflector can be minimized, costs for manufacturing the light scanning apparatus may be lowered, and noise generated upon light scanning may be reduced.

Second, an angle at which light for synchronous signal detection is incident upon a photodetector may be set to substantially about 0 degrees. Thus, the drawbacks of the synchronous signal detection may be reduced compared with conventional apparatuses.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light scanning apparatus comprising:
    a light source;
    a light deflector deflecting light emitted from the light source;
    an image formation optical system to direct light deflected by the light deflector on a scan area of a surface to be scanned;
    a light path changer disposed between said light source and said light deflector to change a path of the light emitted from the light source and incident upon the light deflector,
    wherein an incident angle of a light reflected by said light path changer with respect to said light deflector is smaller than an incident angle of a direct light from said light source with respect to said light deflector.

2. The light scanning apparatus of claim 1, wherein the light path changer comprises at least two mirrors.

3. The light scanning apparatus of claim 1, further comprising:
    a light detector that receives the light emitted from the light source and converts the light into a synchronous signal;
    wherein the light detector and the light source are installed on the same surface and the light emitted from the light source is substantially parallel to the light incident upon a light-receiving surface of the light detector.

* * * * *